(12) United States Patent
Jang

(10) Patent No.: US 10,967,849 B2
(45) Date of Patent: Apr. 6, 2021

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventor: Do Youn Jang, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 111 days.

(21) Appl. No.: 15/833,897

(22) Filed: Dec. 6, 2017

(65) Prior Publication Data
US 2018/0290644 A1 Oct. 11, 2018

(30) Foreign Application Priority Data
Apr. 6, 2017 (KR) .................. 10-2017-0044705

(51) Int. Cl.
| | | |
|---|---|---|
| *B60W 20/10* | (2016.01) | |
| *B60W 30/188* | (2012.01) | |
| *B60W 40/02* | (2006.01) | |
| *B60K 28/16* | (2006.01) | |

(52) U.S. Cl.
CPC ............ *B60W 20/10* (2013.01); *B60K 28/16* (2013.01); *B60W 30/188* (2013.01); *B60W 40/02* (2013.01); *B60W 2520/10* (2013.01); *B60W 2530/10* (2013.01); *B60W 2540/10* (2013.01); *B60W 2555/20* (2020.02); *B60W 2710/083* (2013.01)

(58) Field of Classification Search
CPC ....................................................... B60K 28/16
See application file for complete search history.

(56) References Cited

U.S. PATENT DOCUMENTS

| | | | | |
|---|---|---|---|---|
| 2005/0235820 A1* | 10/2005 | Fujiwara | ................. | B60T 7/042 91/369.2 |
| 2008/0119328 A1* | 5/2008 | Satou | .................... | B60W 10/02 477/181 |
| 2009/0259360 A1* | 10/2009 | Petricoin, Jr. | .......... | G01C 21/26 701/31.4 |
| 2010/0037686 A1* | 2/2010 | Kitagawa | ............ | G01M 17/022 73/146 |
| 2011/0041802 A1* | 2/2011 | Kar | ....................... | F02D 31/003 123/352 |

(Continued)

FOREIGN PATENT DOCUMENTS

| | | |
|---|---|---|
| JP | 106-55959 A | 3/1994 |
| KR | 10-2001-0094753 A | 11/2001 |

(Continued)

*Primary Examiner* — Peter D Nolan
*Assistant Examiner* — Ce Li Li
(74) *Attorney, Agent, or Firm* — Morgan, Lewis & Bockius LLP

(57) ABSTRACT

A vehicle includes a plurality of wheels; a motor configured to apply a driving force to the plurality of wheels; a rain detector configured to detect a precipitation; a temperature detector configured to detect outside temperature; and a controller configured to control a torque of the motor based on the precipitation detected by the rain detector and the outside temperature detected by the temperature detector.

13 Claims, 14 Drawing Sheets

(56) References Cited

U.S. PATENT DOCUMENTS

| | | | |
|---|---|---|---|
| 2012/0310506 A1* | 12/2012 | McDonald | F02D 41/40 |
| | | | 701/102 |
| 2013/0138318 A1* | 5/2013 | Choby | B60T 8/175 |
| | | | 701/84 |
| 2013/0231816 A1* | 9/2013 | Hirata | B60L 15/2054 |
| | | | 701/22 |
| 2016/0214504 A1* | 7/2016 | Park | B60L 15/20 |
| 2017/0043782 A1* | 2/2017 | Farrell | B60W 40/08 |
| 2017/0137056 A1* | 5/2017 | Aoki | B62D 5/0463 |
| 2017/0298811 A1* | 10/2017 | Santillo | G01C 21/26 |
| 2018/0134292 A1* | 5/2018 | Alpman | B60T 7/122 |
| 2018/0290644 A1* | 10/2018 | Jang | B60K 28/16 |

FOREIGN PATENT DOCUMENTS

| | | |
|---|---|---|
| KR | 10-2006-0049538 A | 5/2006 |
| KR | 10-2008-0098176 A | 11/2008 |
| KR | 10-2009-0061182 A | 6/2009 |
| KR | 10-2010-0052874 A | 5/2010 |
| KR | 10-2014-0045830 A | 4/2014 |
| KR | 10-1610019 B1 | 4/2016 |

* cited by examiner

FIG. 5A

| SPEED (Km/h) \ APS (N/m²) | 0 | 10 | 20 | ... | 90 | 100 |
|---|---|---|---|---|---|---|
| 0 | 0 | 13 | 27 | ... | 83 | 100 |
| 10 | ... | ... | ... | ... | ... | ... |
| ⋮ | ... | ... | ... | ... | ... | ... |
| 90 | 0 | ... | ... | ... | ... | ... |
| 100 | 0 | ... | ... | ... | ... | ... |
| ... | ... | ... | ... | ... | ... | ... |

FIG. 5B

| WEIGHT (kgf) | 60 | ... | 300 |
|---|---|---|---|
| FIRST CORRECTION VALUE | 0.90 | ... | 0.99 |

FIG. 5C

| PRECITITATION (mm) | 10 | ... | 200 |
|---|---|---|---|
| SECOND CORRECTION VALUE | 0.99 | ... | 0.83 |

FIG. 5D

| TEMPERATURE (°C) | −30 | ... | −10 |
|---|---|---|---|
| THIRD CORRECTION VALUE | 0.80 | ... | 0.95 |

VEHICLE AND METHOD OF CONTROLLING THE SAME

CROSS-REFERENCE TO RELATED APPLICATION

This application claims priority to and the benefit of Korean Patent Application No. 10-2017-0044705, filed on Apr. 6, 2017 in the Korean Intellectual Property Office, the disclosure of which is incorporated by reference in its entirety.

TECHNICAL FIELD

Embodiments of the present disclosure relate a vehicle of preventing slip of wheels, and a method of controlling the vehicle.

BACKGROUND

A vehicle is a mobile machine that drives wheels to move on the road.

The vehicle includes internal combustion engine vehicles (general known as engine vehicles) generating mechanical power by burning fuel such as gasoline or diesel made from oil (e.g., petroleum, etc.) to travel on the road, and eco-friendly vehicles using electricity as a power source to increase fuel efficiency and reduce harmful gas emissions.

Examples of the eco-friendly vehicles are an electric vehicle, a hybrid vehicle, and a hydrogen fuel cell vehicle. The electric vehicle includes a motor and a rechargeable battery, and drives wheels by using the rotational force of the motor powered by accumulated electricity from the rechargeable battery. The hybrid vehicle includes an engine, a battery, and a motor, and travels by using both mechanical power of the engine and electric power of the motor.

SUMMARY

Therefore, an aspect of the present disclosure is to provide a vehicle of controlling a torque of a motor based on an amount of pressure applied on an accelerator pedal and speed, and a method of controlling the same.

Another aspect of the present disclosure is to provide a vehicle of controlling a torque of a motor based on at least one of a friction force of a road surface and weight, and a method of controlling the same.

In accordance with one aspect of the present disclosure, a vehicle includes: a plurality of wheels; a motor configured to apply a driving force to the plurality of wheels; a rain detector configured to detect a precipitation; a temperature detector configured to detect an outside temperature; and a controller configured to control a torque of the motor based on the precipitation detected by the rain detector and the outside temperature detected by the temperature detector.

The vehicle may further include a speed detector configured to detect a travel speed of vehicle; and a pressure detector configured to detect a pressure applied to an accelerator pedal. The controller obtains a torque of the motor based on the travel speed detected by the speed detector and the pressure detected by the pressure detector, and adjusts the obtained torque based on at least one of the precipitation detected by the rain detector and the outside temperature detected by the temperature detector.

The vehicle may further include a storage configured to store correction values corresponding to a precipitation and an outside temperature. The controller adjusts the obtained torque based on the correction values stored in the storage.

The vehicle may further include a weight detector configured to detect at least one of weight of a passenger and weight of a loaded load. The controller adjusts the obtained torque based on the at least one detected weight.

The vehicle may further include an input configured to receive a number of passengers. The controller adjusts the obtained torque based on the number of passengers input by the input.

The vehicle may further include an input configured to receive weather information of snow and frost. The controller adjusts the obtained torque based on the weather information input by the input.

In accordance with another aspect of the present disclosure, a vehicle comprising: a plurality of wheels; a motor configured to apply a driving force to the plurality of wheels; a weight detector configured to detect weight applied to the vehicle; a speed detector configured to detect a travel speed of vehicle; a pressure detector configured to detect a pressure applied to an accelerator pedal; and a controller configured to obtain a torque of the motor based on the travel speed detected by the speed detector and the pressure detected by the pressure detector, and to control the obtained torque based on the precipitation detected by the rain detector and the weight detected by the weight detector.

The weight detector detects weight of a passenger and weight of a loaded load.

The vehicle may further include an input configured to receive weight of a loaded load.

The vehicle may further include a rain detector configured to detect a precipitation, The controller adjusts the obtained torque based on the precipitation detected by the rain detector.

The vehicle may further include a rain detector configured to detect a precipitation; a temperature detector configured to detect outside temperature. The controller determines whether a road surface is in a freezing state based on the precipitation detected by the rain detector and the outside temperature detected by the temperature detector, and when the road surface is in the freezing state, adjusts a torque of the motor.

The vehicle may further include an input configured to receive weather information of snow and frost. The controller adjusts the obtained torque based on the weather information input by the input.

The controller adjusts the obtained torque based on the weight detected by the weight detector such that A driving force corresponding to a torque of the motor is smaller than a friction force between the plurality of wheels and a road surface.

The vehicle may further include a reducer disposed between the plurality of wheels and the motor. The controller identifies a gear ratio of the reducer, and adjusts the obtained torque based on the identified gear ratio.

In accordance with another embodiment in the present disclosure, a method of controlling a vehicle having a motor to apply a driving force to the plurality of wheels, the method include steps of: obtaining a travel speed based on detection information detected by a speed detector; obtaining a pressure applied to an accelerator pedal based on detection information detected by a pressure detector; obtaining a torque of the motor based on the travel speed and the pressure; obtaining state information of a road surface; and adjusting the obtained torque based on the state information of the road surface.

The step of obtaining state information of a road surface may include: obtaining a precipitation based on detection information detected by a rain detector; and obtaining outside temperature based on detection information detected by a temperature detector.

The step of obtaining state information of a road surface may include: obtaining weather information input by an input. The weather information includes rain, snow, frost, a precipitation and an amount of snowfall.

The step of adjusting the obtained torque comprises: obtaining weight applied to the vehicle, and adjusting the obtained torque based on the obtained weight. The obtained weight includes at least one of weight of a passenger and weight of a load loaded on the vehicle.

The step of obtaining weight applied to the vehicle may include: obtaining the weight based on the detection information detected by a weight detector provided in a seat and a trunk, respectively.

The step of obtaining weight applied to the vehicle may include: obtaining the weight based on a number of passenger and an amount of load input by an input.

The method may further include: maintaining the obtained torque when the obtained precipitation is less than a reference precipitation and the obtained weight is smaller than a reference weight.

The step of adjusting the obtained torque may include steps of: reducing the obtained torque when the obtained precipitation is higher than or equal to the reference precipitation, and reducing the obtained torque the obtained weight is higher than or equal to the reference weight.

The step of reducing the obtained torque when the obtained precipitation is higher than or equal to the reference precipitation may include: reducing more a obtained torque when the obtained outside temperature is lower than a reference outside temperature than a obtained torque when the obtained outside temperature is higher than or equal to the reference outside temperature.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 5A to 5D are views illustrating an example of information stored in a storage of the vehicle according to an embodiment of the present disclosure.

DETAILED DESCRIPTION

Figure 1:
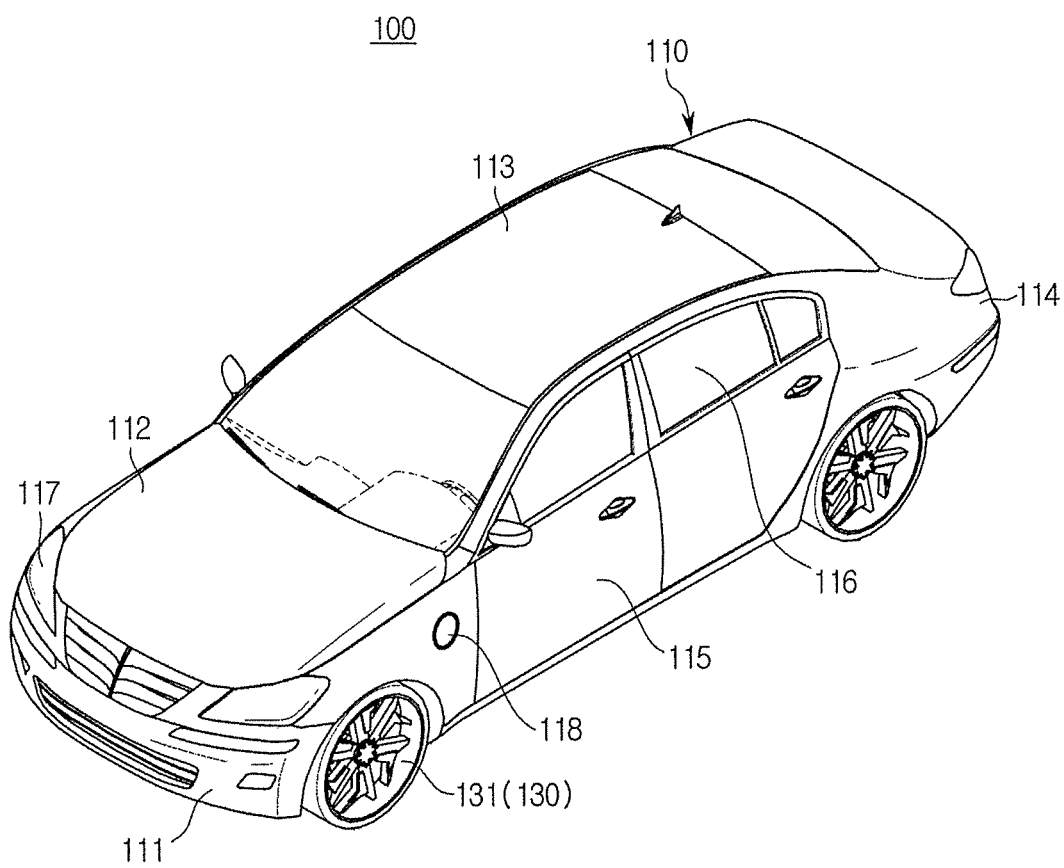
FIG. 1 shows an exterior of a vehicle according to an embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

Figure 2:
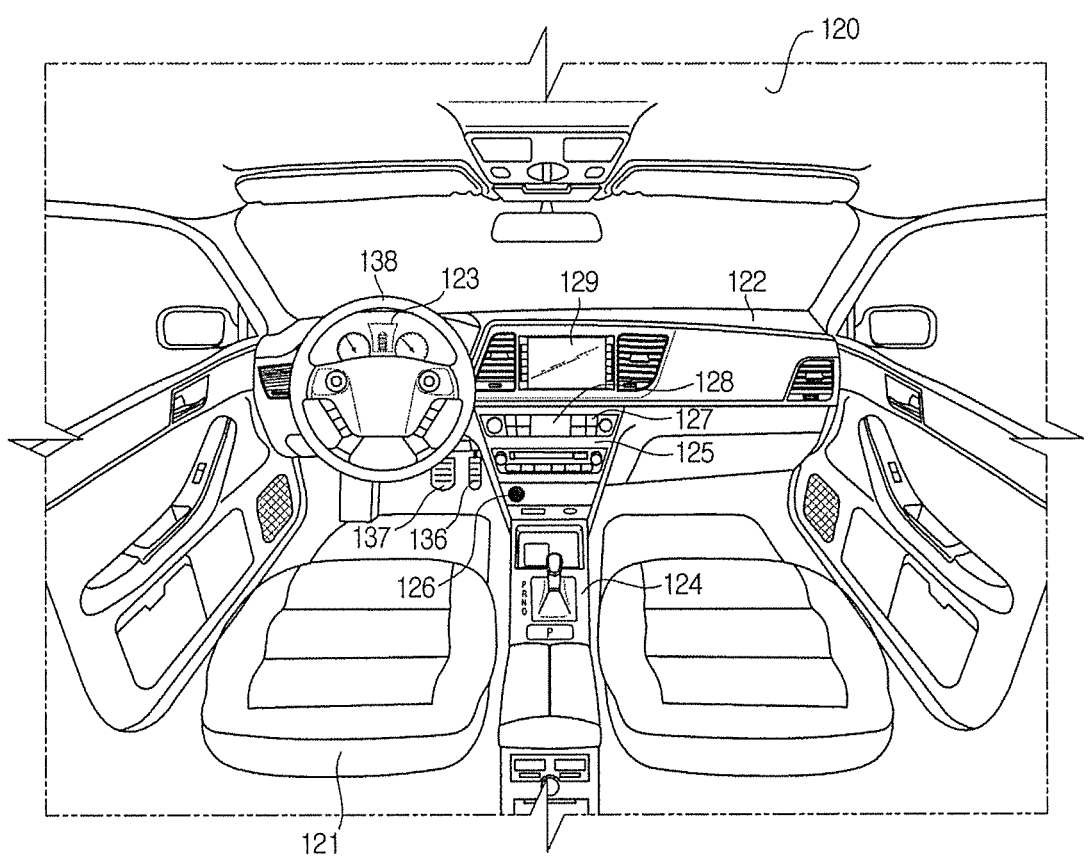
FIG. 2 shows an interior of the vehicle of FIG. 1 according to the embodiment of the present disclosure.
Figure 3:
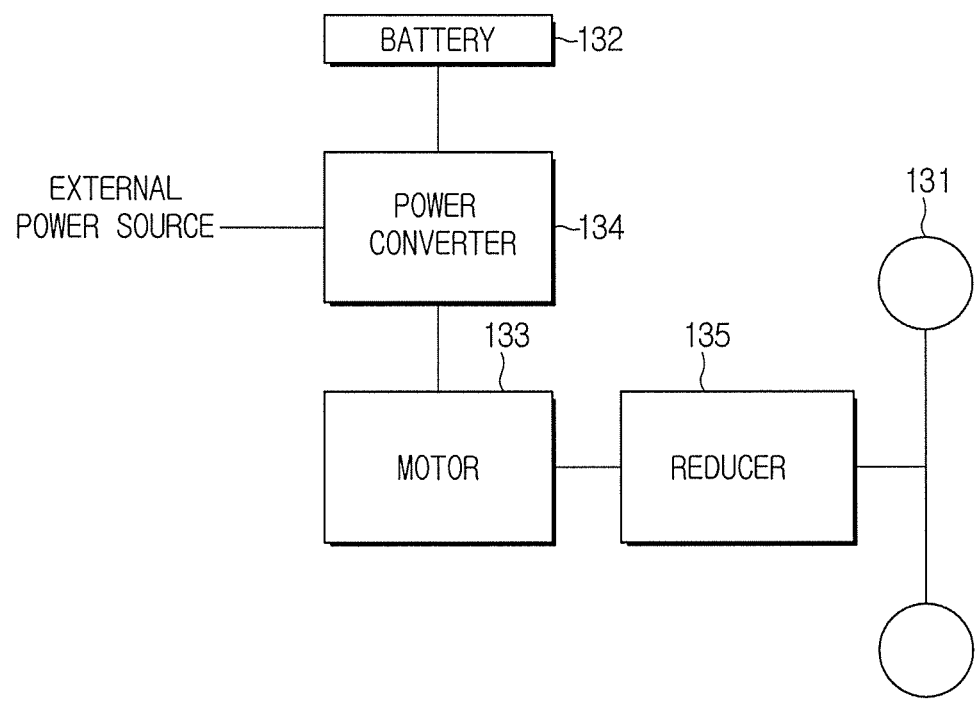
FIG. 3 is a block diagram showing an example of a chassis included in the vehicle of FIG. 1 according to the embodiment of the present disclosure.

FIG. 1 shows an exterior of a vehicle according to an embodiment of the present disclosure. FIG. 2 shows an interior of the vehicle of FIG. 1 according to the embodiment of the present disclosure. FIG. 3 is a block diagram showing an example of a chassis included in the vehicle of FIG. 1 according to the embodiment of the present disclosure.

Herein, the vehicle may be any one of an internal-combustion engine vehicle (a general engine vehicle) of burning oil fuel, such as gasoline or diesel, to generate mechanical power, and traveling using the mechanical power, an electric vehicle including a motor and a battery which is a chargeable power source to rotate the motor using electricity accumulated in the battery and to drive wheels using the rotation of the motor, a hybrid vehicle including an engine, a battery, and a motor to control the mechanical power of the engine and the electrical power of the motor to travel, and a hydrogen fuel cell vehicle of charging a battery using electricity generated by a reaction of hydrogen with oxygen in the air, and rotating a motor using power of the charged battery to travel.

In the current embodiment, the vehicle is assumed to be an electric vehicle.

Referring to FIGS. 1 and 2, a vehicle 100 may include a body having an exterior 110 and an interior 120, and a chassis 130 corresponding to the remaining portion of the vehicle 100 except for the body, wherein mechanical components required for driving are installed in the chassis 130.

As shown in FIG. 1, the exterior 110 of the body may include a front panel 111, a hood 112, a roof panel 113, a rear panel 114, front, rear, left and right doors 115, and a plurality of window glass panels 116 respectively installed in the front, rear, left, and right doors 115 in such a way to be able to open or close.

Also, the exterior 110 of the body may include a plurality of fillers installed at the borders between the front, rear, left, and right doors 115 and the window glass panels 116, a plurality of side-view mirrors to provide a driver with a rear view of the vehicle 100, lamps 117 (headlamps and other lamps or lights) to enable the driver to easily see surroundings while keeping his/her eyes forward and to perform a function of signaling or communicating with other vehicles and pedestrians, and a charging port 118 which a plug of an external charger is inserted into and connected to.

The lamps 117 may be positioned in the front and rear portions of the exterior 110 of the vehicle 100, and perform a function of signaling or communicating with other vehicles and pedestrians, as well as a lighting function.

The lamps 117 may include an illuminating lamp to illuminate a long distance, a short distance, and a rear direction, a signal lamp to inform of a braking action, a turning direction, and an emergency situation, and a display lamp to display the width of the vehicle 100, the height of the body, license plate lighting, and parking.

The lamps 117 positioned in the front portion of the exterior 110 of the vehicle 100 may include headlamps including high beams and low beams, fog lamps, side lamps, turn signal lamps, and an emergency lamp.

The lamps 117 positioned in the rear portion of the exterior 110 of the vehicle 100 may include side lamps to display the boundaries in width direction of the vehicle 100, turn signal lamps, tail lamps, brake lamps, a backup lamp, an emergency lamp, and a license plate lamp.

As shown in FIG. 2, the interior 120 of the body may include a seat 121 on which a passenger sits, a dashboard 122, and an instrument panel (i.e., an instrument cluster 123) disposed on the dashboard 122. In the dashboard 122, a tachometer, a speedometer, a fuel gauge, a turn signal indicator, a high beam indicator light, a warning light, a seatbelt warning light, an odometer, a shift lever indicator light, a door open warning light, etc. are installed. Also, in the interior 120 of the body, a center fascia 124 in which a vent and a control plate of an air conditioner are disposed, a head unit 125 disposed in the center fascia 124 to receive commands for operating audio system and an air conditioner, and a starter 126 disposed in the center fascia 124 to receive a start command may be provided.

The vehicle 100 may further include a shift lever disposed in the center fascia 124 to receive a the driver's manipulation input, and a parking button (i.e., an Electric Parking Brake (EPB) button) disposed around the shift lever or in the head unit 125 to receive an operation command for an EPB apparatus (not shown).

The vehicle 100 may further include an input device 127 to receive operation commands for various functions.

The input device 127 may be disposed in the head unit 125 and the center fascia 124, and may include at least one physical button, such as on/off buttons for executing or stopping various functions and buttons for changing setting values of the various functions.

The input device 127 may further include a jog dial (not shown) or a touch pad (not shown) to enable a user to input commands for moving or selecting a cursor displayed on a display of a user interface 129.

The jog dial or the touch pad may be disposed in the center fascia 124.

The vehicle 100 may further include a display 128 disposed in the head unit 125 and configured to display information about a function being performed by the vehicle 100 and information input by the user.

The vehicle 100 may further include the user interface 129 for the user's convenience.

The user interface 129 may be embedded into or fixed on the dashboard 122.

The user interface 129 may include a display panel as a display, and a touch panel as an input device.

In other words, the user interface 129 may include only a display panel, or may include a touch screen into which a display panel and a touch panel are integrated.

If the user interface 129 is implemented with only a display panel, the user interface 129 may receive a user's input of selecting a button displayed on the display panel through the input device 127 provided in the center fascia 124.

If the user interface 129 is implemented with a touch screen, the user interface 129 may receive operation commands from the user through the touch panel.

The user interface 129 may perform an audio function, a video function, a navigation function, a broadcasting (Digital Multimedia Broadcasting (DMB)) function, and a radio function.

The user interface 129 may display information about a function being executed, and information input by a user.

Referring to FIGS. 1 to 3, the chassis 130 of the vehicle 100 may be a frame supporting the exterior 110 and interior 120 of the body, and may include a plurality of wheels 131 disposed to the front, rear, left, and right of the body, a power apparatus 132 to 135 to apply a driving force to the front, rear, left, and right wheels 131, a steering apparatus, a brake apparatus to apply a brake force to the front, rear, left, and right wheels 131, and a suspension apparatus.

The power apparatus may generate a driving force required for driving the vehicle 100, and adjust the driving force. The power apparatus may include a power generating device and a power transferring device.

As shown in FIG. 3, the power generating device may include a battery 132, a motor 133, and a power converter 134. The power transferring device may include a reducer 135.

The battery 132 may generate power of high-voltage current, and supply the power to the motor 133.

The battery 132 may receive power from an external power source through a plug inserted in the charging port 118 to be charged.

The external power source may be a charger installed in a parking lot or a charging station.

Further, the battery 132 may receive power from the motor 133 to be charged.

The motor 133 may generate a driving force for rotating the plurality of wheels 131 and transmit the driving force to the reducer 135.

The motor 133 may operate as a generator by a rotation force transferred through the plurality of wheels 131 in an energy regeneration condition by braking, deceleration, or low-speed driving, thereby charging the battery 132.

The power converter 134 may convert power of the battery 143 into driving power of the motor 133, or convert power of an external power source into charging power for the battery 132.

Further, the power converter 134 may include an inverter and a converter.

The power converter 134 may change a direction and output of current between the motor 133 and the battery 132.

The reducer 135 may convert revolutions per minute (RPM) of the motor so that driving speed of the vehicle reaches target speed. More specifically, the reducer 135 may generate a driving force corresponding to the converted RPM of the motor, and transmit the generated driving force to the left and right wheels 131, respectively.

The reducer 135 may convert the RPM of the motor to a predetermined ratio.

The target speed may be speed corresponding to pressure applied on the accelerator pedal 136 or pressure applied on the brake pedal 137.

The vehicle 100 may further include an auxiliary battery (not shown) configured to generate low-voltage current, and electrically connected to the audio system, indoor lamps, and other electronic components to supply the low-voltage current as driving power to the audio system, the indoor lamps, and the other components. The auxiliary battery may be charged by the battery 132.

The vehicle 100 may include the accelerator pedal 136 that is pressed by the user according to the user's acceleration intention, the brake pedal 137 that is pressed by the user according to the user's brake intention, and a steering wheel 138 of the steering apparatus for controlling a driving direction (see FIG. 2).

Further, the vehicle 100 may include several safety devices for the driver and passenger's safety.

The safety devices of the vehicle 100 may include various kinds of safety devices, such as an airbag control device configured to ensure a driver and passenger's safety in the event of a vehicle crash, an Electronic Stability Control (ESC) device configured to control an orientation of the vehicle when the vehicle accelerates and turns, and Traction Control System (TCS) configured to control a driving force of the vehicle in order to prevent idling of wheels during starting or accelerating, especially, in wet, icy or snowy conditions.

Figure 4:
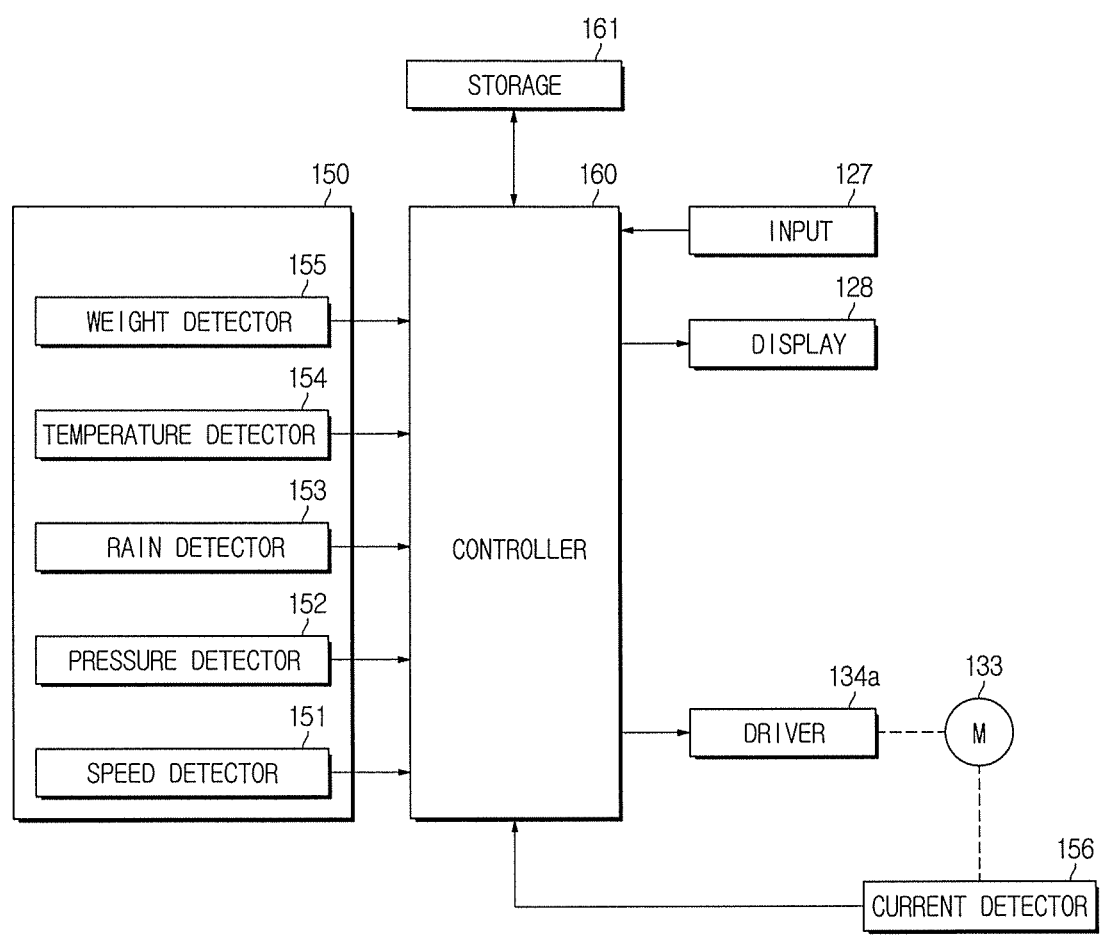
FIG. 4 is a control block diagram of the vehicle according to an embodiment of the present disclosure.

FIG. 4 is a control block diagram of the vehicle according to the embodiment of the present disclosure. The vehicle 100 will be described with reference to FIGS. 5A to 5D, below.

The vehicle 100 may include the input device 127, the display 128, the motor 133, a driver 134a, a detector 150, a controller 160, and a storage device 161.

The controller 160 is an electric circuitry that executes instructions of software which thereby performs various functions described hereinafter.

In a slip prevention mode, the input device 127 may receive state information of a road surface, information about the number of passengers, information about weight of passengers, and information about an amount of load loaded in the vehicle.

The state information of the road surface may include information about an amount of water existing on the road surface, and information about a frozen state of the road surface.

For example, the information about the amount of water existing on the road surface may include a "small amount", a "median amount" and a "large amount". The information about the frozen state of the road surface may include a "non-frozen state" and a "frozen state".

The input device 127 may receive information about passengers, such as an adult and a child.

The input device 127 may include at least one of a button, a switch, and a key.

The display 128 may display information about whether the slip prevention mode is executed, and information input by the user.

The display 128 may display at least one of the state information of the road surface, outside temperature information, weather information, season information, information about the number of passengers, weight information, and speed information.

The weather information may include information about whether it rains, information about whether it snows, information about whether it hails, and information about whether it frosts.

The weight information may include weight of passengers and weight of load loaded in the vehicle 100.

The display 128 may be a display provided in the head unit 125, a display (not shown) provided in the cluster 123, or a display provided in the user interface 129.

The motor 133 may transmit a driving force to the reducer 135 connected to the plurality of wheels 131.

The driver 134a may drive the motor 133 based on a control command from the controller 160 to generate a torque of the motor corresponding to a road surface condition.

The road surface condition corresponds to the state information of the road surface.

The driver 134a may convert DC power to AC power, and apply the AC power to the motor 133.

The driver 134a may include a plurality of switching elements. The driver 134a may be an inverter to convert a voltage and frequency of the AC power applied to the motor 133 using the plurality of switching elements.

That is, the driver 134a may be a power converter 134 having an inverter.

The detector 150 may detect driving state information of the vehicle 100 and state information of the road surface, and output the detected information, in order to execute the slip prevention mode.

The slip prevention mode may be a mode for controlling a torque of the motor 133 in order to prevent slip of the wheels 131 when the vehicle starts or accelerates.

The state information of the road surface may be information about whether any factor influencing a change in friction force between the road surface and the wheels 131 exists on the road surface.

The driving state information of the vehicle 100 may be information about a state of the vehicle 100 influencing a change in friction force between the road surface and the wheels 131.

A friction force (F) between the road surface and the wheels 131 may depend on weight of the vehicle (N=mg) and a coefficient of friction ($\mu$) between the road surface and the wheels 131.

The coefficient of friction ($\mu$) between the road surface and the wheels 131 may be changed according to a road surface condition, and the weight of the vehicle 100 (N=mg) may be changed according to weight of passengers and weight of load loaded in the vehicle 100.

The coefficient of friction ($\mu$) between the road surface and the wheels 131 may be a coefficient of kinetic friction.

The detector 150 may include a speed detector 151, a pressure detector 152, a rain detector 153, a temperature detector 154, and a weight detector 155.

The speed detector 151 may include a plurality of wheel speed sensors respectively installed in the front, rear, left, and right wheels 131 and configured to output detection information (i.e., wheel speed information) corresponding to the rotational speeds of the wheels 131.

The speed detector 151 may include an acceleration sensor to output detection information (i.e., acceleration information) corresponding to acceleration of the vehicle 100.

The pressure detector 152 may output detection information (i.e., pressure information) corresponding to pressure applied on the accelerator pedal 136.

The pressure information may be an amount of acceleration corresponding to the driver's acceleration intention.

The speed information and the pressure information may be torque control information of the motor 133 for preventing slip of the wheels 131 when a friction force of the road surface is greater than or equal to a reference friction force.

The reference friction force may be a friction force that is generated when there is neither water nor ice on the road surface and weight of the vehicle 100 is smaller than or equal to a reference weight.

The reference friction force may be a force of the same magnitude as a driving force of the wheels 131 when a torque of the motor is a maximum torque.

The reference friction force and the driving force of the wheels 131 may be values obtained by experiments.

The rain detector 153 may be disposed in a wiper or the window glass panels 116 to determine whether it rains and to output detection information (that is, information about whether it rains and information about a precipitation) corresponding to a precipitation (an amount of rainwater).

The temperature detector 154 may be disposed on the exterior of the vehicle 100 to detect outside temperature and to output detection information (i.e., temperature information) corresponding to the outside temperature.

The weight detector 155 may detect weight of passengers, and output detection information (i.e., weight information) corresponding to the weight of passengers.

The weight detector 155 may be disposed in the driver's seat, a front passenger's seat, and a rear seat, respectively. The weight detector 155 may be a weight sensor to detect weight of passengers, or a pressure sensor to detect pressure of passengers.

The weight detector 155 may include a seatbelt sensor for detecting any passenger in order to predict weight of passengers.

Moreover, the weight detector 155 may be disposed in a trunk to detect weight of load loaded in the trunk.

If the vehicle 100 is a truck, the weight detector 155 may be disposed in a carrying box to detect weight of load placed in the carrying box.

The information about whether it rains and the information about the precipitation detected by the rain detector 153, the outside temperature information detected by the temperature detector 154, and the weight information detected by the weight detector 155 may be information for changing a friction force of the road surface to smaller than the reference friction force, and may be torque control information of the motor 133 for preventing slip of the wheels 131.

The detector 150 may further include a current detector 156 to detect current flowing through the motor 133 and to output information corresponding to the detected current.

The current flowing through the motor 133 may be information for controlling torque or speed of the motor.

The controller 160 may obtain speed of the vehicle 100 based on detection information output from the plurality of wheel speed sensors and/or detection information output from the acceleration sensor.

The speed of the vehicle 100 may be driving speed of the vehicle 100.

The controller 160 may obtain pressure of the accelerator pedal 137 corresponding to detection information output from the pressure detector 152.

When the vehicle 100 starts or accelerates, the controller 160 may perform the slip prevention mode based on detection information detected by the detector 150.

The slip prevention mode may interwork with the TCS.

The controller 160 may recognize pressure applied on a start button to determine that the vehicle 100 starts. Also, the controller 160 may recognize pressure applied on the accelerator pedal 137 to determine that the vehicle 100 accelerates.

More specifically, the controller 160 may obtain outside temperature corresponding to detection information output from the temperature detector 154, an amount of rainwater corresponding to detection information output from the rain detector 153, and weight corresponding to detection information output from the weight detector 155.

When passenger information is input through the input device 127, the controller 160 may determine whether the passenger is an adult or a child based on the passenger information to estimate weight of the passenger based on the result of the determination.

Further, the controller 160 may obtain a torque of the motor corresponding to the speed information of the vehicle 100 and the pressure information of the accelerator pedal 137, adjust the torque of the motor 133 based on at least one of the outside temperature, the precipitation, the information about whether it rains, information about the amount of rainwater, and the weight of the vehicle 100, and control driving of the motor 133 based on the adjusted torque of the motor 133.

The obtained torque of the motor 133 may be a value obtained by a driving force of the vehicle 100 and a gear ratio of the reducer 135. The torque of the motor 133 may be obtained experimentally and stored.

(Driving Force of Vehicle=Gear Ratio×Torque of Motor)

Controlling driving of the motor 133 may include controlling at least one of current, a voltage, and a frequency applied to the motor 133.

The gear ratio of the reducer 135 may be a predetermined value.

If the gear ratio of the reducer 135 of the vehicle 100 is changeable, the controller 160 may obtain a changed gear ratio, and then obtain a torque of the motor 133 based on the gear ratio and a driving force.

If the outside temperature is higher than or equal to reference outside temperature, the precipitation is less than a reference precipitation, and the weight is smaller than or equal to a reference weight, the controller 160 may obtain a torque of the motor 133 corresponding to the speed information of the vehicle 100 and the pressure information of the accelerator pedal 137, and control driving of the motor 133 based on the torque of the motor 133.

The reference precipitation may be an amount of water of when the road surface was wet by rain or snow, not by washing.

Alternatively, the reference precipitation may be an amount of water at which hydroplaning occurs.

The reference weight may be weight of when only one passenger, that is, a driver is present in the vehicle 100.

The reference temperature may be temperature at which water on the road surface freezes.

When the precipitation is less than the reference precipitation and the weight is smaller than the reference weight, the controller 160 may control driving of the motor 133 such that the torque of the motor 133 is maintained.

When the precipitation is less than the reference precipitation and the weight is greater than the reference weight, the controller 160 may obtain a first correction value corresponding to the weight, adjust the torque based on the first correction value, and then control driving of the motor 133 based on the adjusted torque.

That is, when the precipitation is less than the reference precipitation, the controller 160 may adjust the torque of the motor 133 based on the weight, regardless of the detected outside temperature.

When the outside temperature is higher than or equal to the reference outside temperature, the precipitation is more than or equal to the reference precipitation, and the weight is smaller than or equal to the reference weight, the controller 160 may obtain a second correction value corresponding to the precipitation, adjust the torque based on the second correction value, and then control driving of the motor 133 based on the adjusted torque.

When the outside temperature is higher than or equal to the reference outside temperature, the precipitation is more than or equal to the reference precipitation, and the weight is greater than or equal to the reference weight, the controller 160 may obtain a first correction value corresponding to the weight, obtain a second correction value corresponding to the precipitation, adjust the torque based on the first correction value and the second correction value, and then control driving of the motor 133 based on the adjusted torque.

When the outside temperature is lower than the reference outside temperature, the precipitation is more than or equal to the reference precipitation, and the weight is smaller than or equal to the reference weight, the controller 160 may obtain a third correction value corresponding to a frozen state of the road surface, adjust the torque based on the third correction value, and then control driving of the motor 133 based on the adjusted torque.

A coefficient of friction when the road surface is in a frozen state is smaller than a coefficient of friction when the road surface is in a wet state.

When outside temperature is lower than the reference outside temperature, the controller 160 may determine that the road surface was frozen, and reduce the torque of the motor 133 more greatly than when outside temperature is higher than or equal to the reference outside temperature under the condition of the same precipitation, thereby reducing a driving force of the vehicle 100.

When the outside temperature is lower than the reference outside temperature, the precipitation is more than or equal to the reference precipitation, and the weight is greater than the reference weight, the controller 160 may obtain a first correction value corresponding to the weight, obtain a third correction value corresponding to the frozen state of the road surface, adjust the torque based on the third correction value and the first correction value, and then control driving of the motor 133 based on the adjusted torque.

The controller 160 may determine strength of ice formed on the road surface based on outside temperature and/or a precipitation, and adjust the third correction value based on the strength of ice.

When controlling the torque of the motor 133, the controller 160 may control the torque of the motor 133 based on detection information detected by the current detector 156.

The controller 160 may perform the slip prevention mode when the slip prevention mode is input through the input device 127.

At this time, the controller 160 may perform the slip prevention mode based on state information of the road surface input through the input device 127 and driving state information of the vehicle 100 output from the detector 150.

More specifically, when weather information (e.g., rain, snow, frost) is input through the input device 127, the controller 160 may obtain a correction value corresponding to the weather information, and adjust the torque based on the correction value.

When a precipitation is input, the controller 160 may obtain a correction value corresponding to the precipitation, and adjust the torque based on the correction value.

For example, the precipitation may be a "large amount", a "median amount", or a "small amount".

Correction values corresponding to an amount of rain, an amount of snow, and an amount of frost may be predetermined values.

When the number of passengers is input through the input device 127, the controller 160 may obtain a correction value corresponding to the number of passengers, and adjust the torque based on the correction value. When an amount of load is input through the input device 127, the controller 160 may obtain a correction value corresponding to the amount of load, and adjust the torque based on the correction value.

For example, the amount of load may be a "large amount", a "median amount", or a "small amount".

The storage device 161 may store the reference outside temperature, the reference precipitation, and the reference weight.

The storage device 161 may store the first correction value corresponding to the weight of the vehicle 100, the second correction value corresponding to the precipitation, and the third correction value corresponding to the frozen state of the road surface.

The storage device 161 will be described in detail with reference to FIGS. 5A to 5D, below.

As shown in FIG. 5A, the storage device 161 may store torques of the motor 133 corresponding to speed of the vehicle 100 and pressure applied on the accelerator pedal 137, in a form of a reference table.

The torque of the motor 133 stored in the form of the reference table may increase as the driving speed of the vehicle 100 increases and as the pressure applied on the accelerator pedal 137 increases.

As shown in FIG. 5B, the storage device 161 may store first correction values corresponding to weights of the vehicle 100. The first correction values may be correction rates (%).

The first correction value may increase as the weight of the vehicle 100 increases.

An increase in weight of the vehicle 100 may include an increase in number of passengers in the vehicle 100.

As shown in FIG. 5C, the storage device 161 may store second correction values corresponding to precipitations.

The second correction value may decrease as the precipitation increases.

As shown in FIG. 5D, the storage device 161 may store third correction values corresponding to frozen states of the road surface.

More specifically, the storage device 161 may store third correction values corresponding to outside temperatures.

Since a frozen road surface has a low friction force, the third correction values may be values for reducing the torque of the motor 133.

The third correction value may become smaller at higher strength of ice.

That is, the third correction value may become smaller at lower outside temperature.

The outside temperature may be information for determining strength of ice formed on the road surface.

The storage device 161 may store correction values corresponding to the numbers of passengers, correction values corresponding to amounts of load, a correction value corresponding to frost, and a correction value corresponding to snow.

The information stored in the storage device 161 may be predetermined information obtained by experiments.

The storage device 161 may be implemented as any one of non-volatile memory (e.g., a cache, Read Only Memory (ROM), Programmable ROM (PROM), Erasable Programmable ROM (EPROM), Electrically Erasable Programmable ROM (EEPROM), flash memory, etc.), volatile memory (e.g., Random Access Memory (RAM)), and storage medium (e.g., a Hard Disk Drive (HDD), a CD-ROM, etc.), although not limited thereto.

The storage device 161 may be memory implemented as a separate chip from the processor described above in regard of the controller 160, or the storage device 161 and the processor may be implemented as a single chip.

As is apparent from the above description, the vehicle 100 may adjust the torque of the motor 133 based on a friction coefficient affecting a friction force of the road surface and weight of the vehicle 100 to thereby prevent a friction force from becoming smaller than a driving force of the wheels 131. As a result, the vehicle 100 can prevent slip of the wheels 131.

That is, the present embodiment can prevent slip of the wheels 131 by making a driving force corresponding to the torque of the motor 133 smaller than a friction force between the wheels 131 and the road surface.

Figure 6:
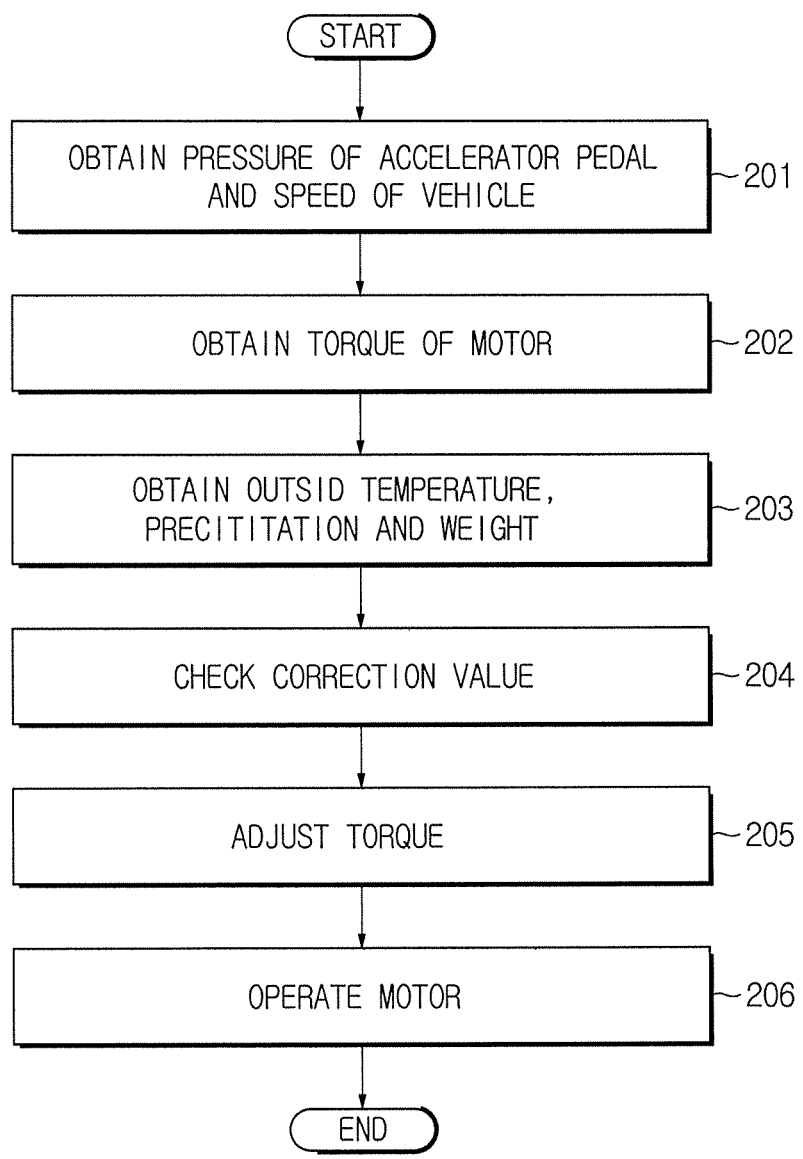
FIG. 6 is a flowchart illustrating a control method of the vehicle according to an embodiment of the present disclosure.

FIG. 6 is a flowchart illustrating a method of controlling the vehicle according to the embodiment of the present disclosure. The method of controlling the vehicle will be described with reference to FIGS. 7, 8A, and 8B, below.

If the starter 126 is turned on, the vehicle 100 may control driving of the motor 122 to start.

If an acceleration command is input by pressure applied on the accelerator pedal 137, the vehicle 100 may control a torque of the motor 133 to increase speed.

If the vehicle 100 travels at predetermined speed or more, the vehicle 100 may control driving of the motor 133 to adjust driving speed.

Thereafter, if a deceleration command or a brake command is input by pressure applied on the brake pedal 136, the vehicle 100 may perform regenerative braking.

If the brake pedal 152 is pressed, oil pressure of a master cylinder (not shown) may be detected by a pressure sensor.

Then, the vehicle 100 may calculate a target brake force based on the detected pressure, obtain a rotatory force corresponding to a part of the target brake force, and perform regenerative braking based on the rotatory force.

In other words, the target brake force may be generated by regenerative braking and the brake apparatus.

Then, when the vehicle 100 stops, the vehicle 100 may stop operating the motor 133.

When the vehicle 100 starts or accelerates, the vehicle 100 may perform the slip prevention mode based on detection information detected by the detector 150.

More specifically, the vehicle 100 may obtain speed of the vehicle 100 based on detection information output from the speed detector 151, and obtain pressure applied on the accelerator pedal 137 based on detection information output from the pressure detector 152, in operation 201.

Then, the vehicle 100 may obtain a torque of the motor 133 corresponding to the speed of the vehicle 100 and the pressure applied on the accelerator pedal 137 from information stored in the storage device 161, in operation 202.

Further, the vehicle 100 may obtain outside temperature based on detection information output from the temperature detector 154, obtain a precipitation based on detection information output from the rain detector 153, and obtain weight of the vehicle 100 based on detection information output from the weight detector 155, in operation 203.

Still further, the vehicle 100 may obtain weather information, such as a precipitation, snow, rain, or frost, and weight of the vehicle 100, based on information input through the input device 127.

Then, the vehicle 100 may obtain a first correction value corresponding to the weight of the vehicle 100, a second correction value corresponding to the precipitation, and a third correction value corresponding to a frozen state of the road surface, from the information stored in the storage device 161, in operation 204.

Successively, the vehicle 100 may adjust the torque based on the first correction value, the second correction value, and the third correction value, in operation 205. Then, the vehicle 100 may drive the motor 133 based on the adjusted torque, in operation 206.

That is, the vehicle 100 may adjust the torque of the motor 133 based on at least one of outside temperature, information about whether it rains, an amount of rainwater (that is, water), and weight of the vehicle 100.

When the motor 133 is driven, the vehicle 100 may obtain current applied to the motor 133 based on detection information detected by the current detector 156, and control switching of the inverter of the power converter 134 based on the current to maintain the adjusted torque of the motor.

Controlling switching of the inverter of the power converter 134 may include controlling an on/off state of a switch element in the inverter, that is, controlling at least one of voltage, current and frequency of the motor 133.

Figure 7A:
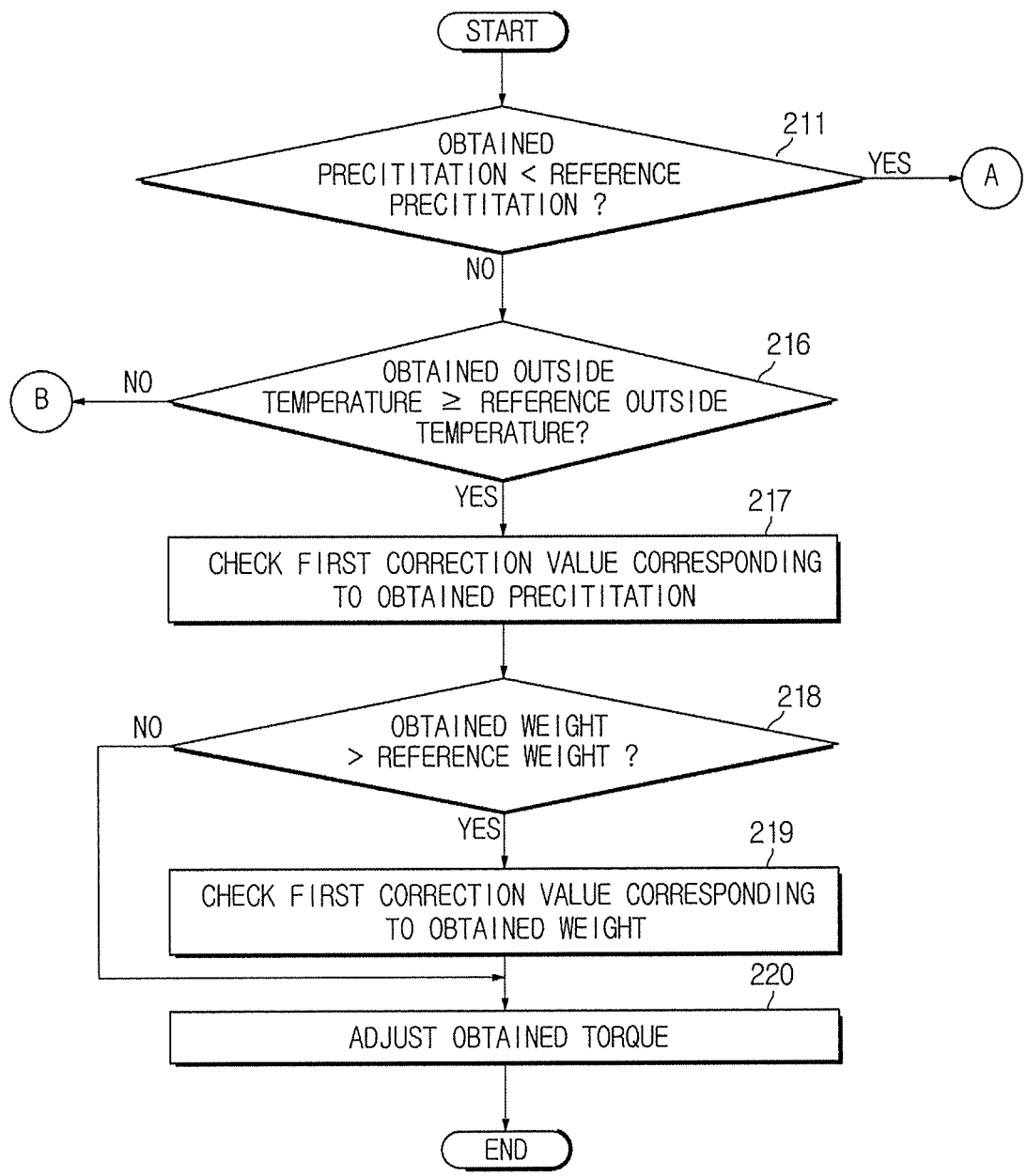
FIGS. 7A to 7C are flowcharts illustrating an adjustment method of a torque of a motor of the vehicle according to an embodiment of the present disclosure.
Figure 7B:
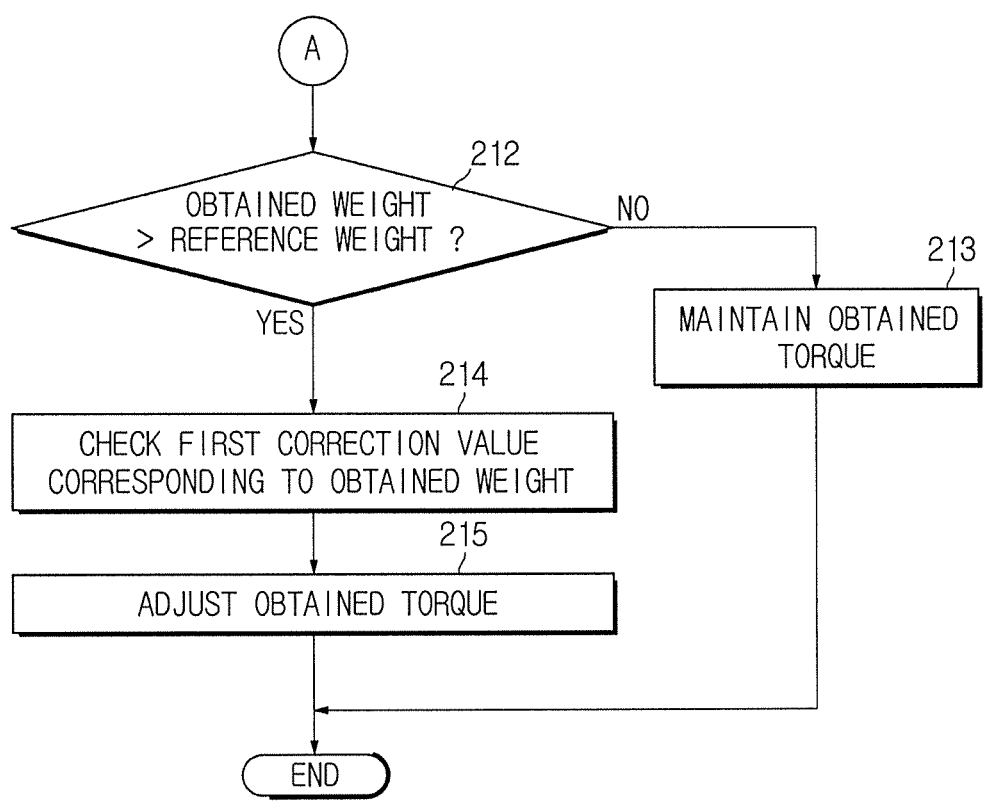
Figure 7C:
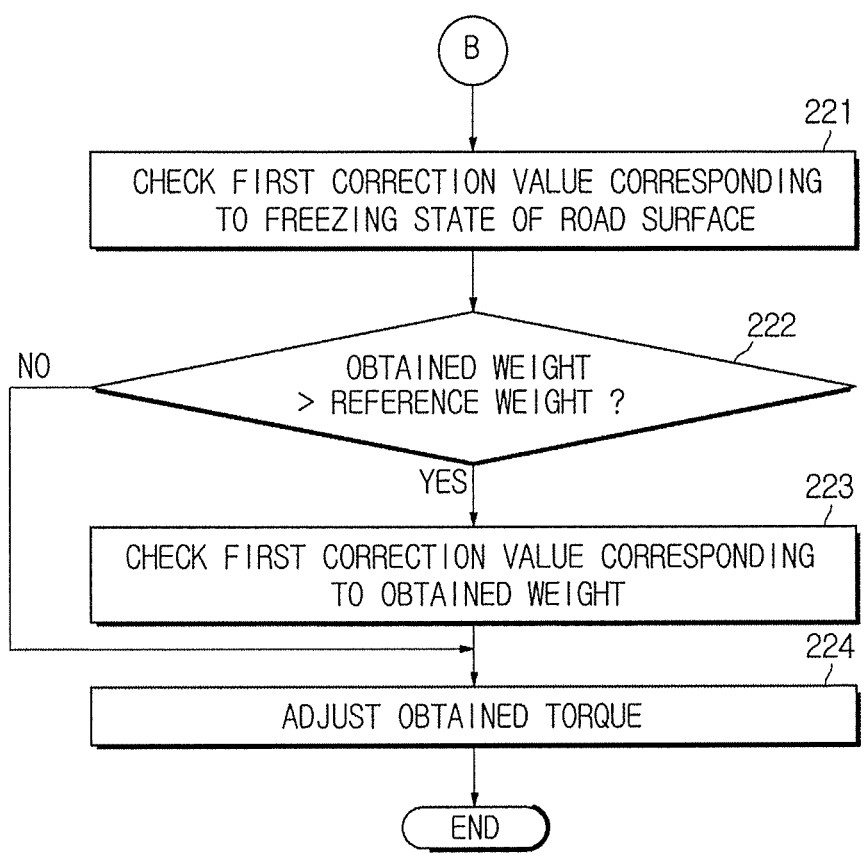

Now, referring to FIGS. 7A to 7C, an order at which the torque of the motor 133 is adjusted will be described in detail.

The vehicle 100 may compare an obtained precipitation to a reference precipitation, in operation 211. When the obtained precipitation is less than the reference precipitation, the vehicle 100 may compare an obtained weight to a reference weight.

When the obtained weight is smaller than or equal to the reference weight, the vehicle 100 may maintain the obtained torque of the motor 133, in operation 213. However, when the obtained weight is greater than the reference weight, the vehicle 100 may obtain a first correction value corresponding to the obtained weight, in operation 214, and adjust the obtained torque of the motor 133 based on the first correction value, in operation 215.

If the obtained precipitation is more than or equal to the reference precipitation, the vehicle 100 may compare obtained outside temperature to reference outside temperature, in operation 216.

If the obtained precipitation is more than or equal to the reference precipitation, and the obtained outside temperature is higher than or equal to the reference outside temperature, the vehicle 100 may obtain a second correction value corresponding to the obtained precipitation, in operation 217.

The vehicle 100 may compare the obtained weight to the reference weight, in operation 218. If the obtained weight is greater than or equal to the reference weight, the vehicle 100 may obtain a first correction value corresponding to the obtained weight, in operation 219, and adjust the obtained torque of the motor 133 based on the first correction value and the second correction value, in operation 220. However, if the obtained weight is smaller than or equal to the reference weight, the vehicle 100 may adjust the obtained torque of the vehicle 100 based on the second correction value, in operation 220.

When the obtained precipitation is more than or equal to the reference precipitation, and the obtained outside temperature is lower than the reference outside temperature, the vehicle may obtain a third correction value corresponding to the obtained outside temperature, in operation 221, and compare the obtained weight to the reference weight, in operation 222.

If the obtained weight is greater than the reference weight, the vehicle may obtain a first correction value corresponding to the obtained weight, in operation 223, and adjust the obtained torque of the motor 133 based on the first correction value and the third correction value, in operation 224. When the obtained weight is smaller than or equal to the reference weight, the vehicle may adjust the obtained torque of the motor 133 based on the third correction value, in operation 224.

The reference precipitation may be an amount of water when the road surface was wet by rain or snow, not by washing.

The reference precipitation may be an amount of water when hydroplaning occurs or at which the road surface can be frozen.

The reference weight may be weight when only one passenger, that is, a driver is present in the vehicle.

The reference temperature may be temperature at which water existing on the road surface is frozen.

When the vehicle 100 determines that the road surface was frozen, the vehicle 100 may subtract a predetermined value form the second correction value, and adjust the torque of the motor 133 based on the subtracted second correction value.

Further, when the vehicle 100 determines that the road surface was frozen, the vehicle may determine strength of ice corresponding to outside temperature, obtain a third correction value corresponding to the strength of ice, and adjust the torque of the motor based on the third correction value.

Figure 8A:
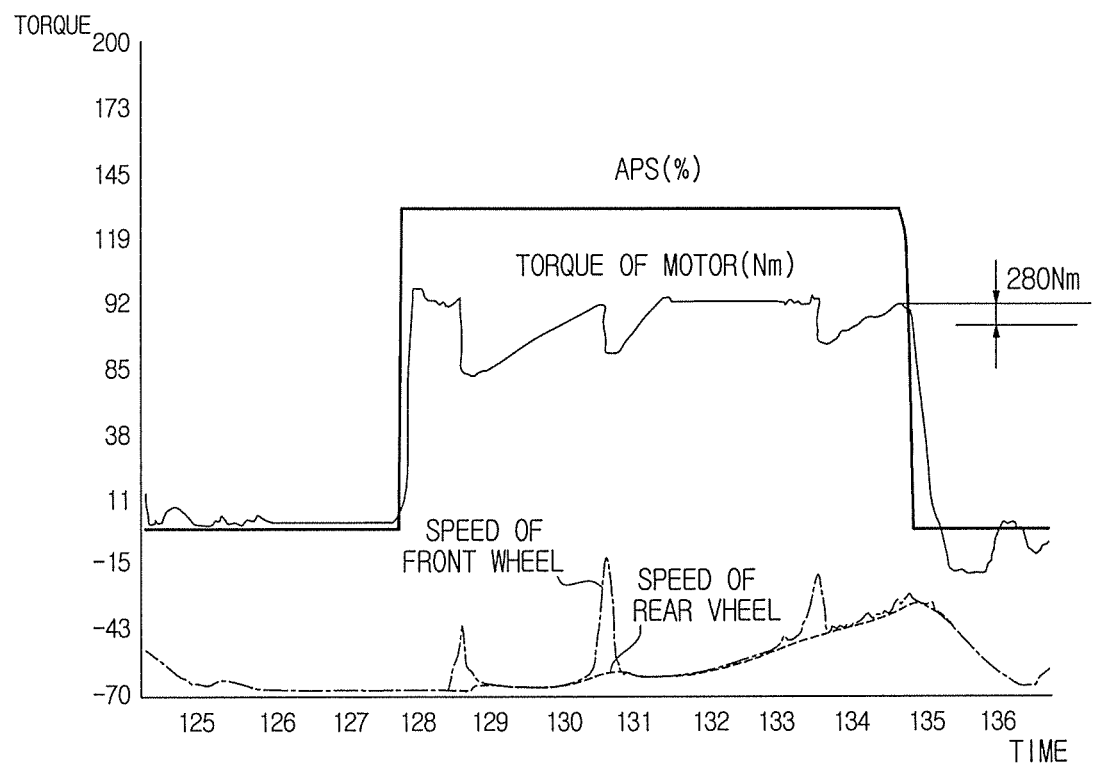
FIG. 8A is a slip graph of a conventional vehicle.
Figure 8B:
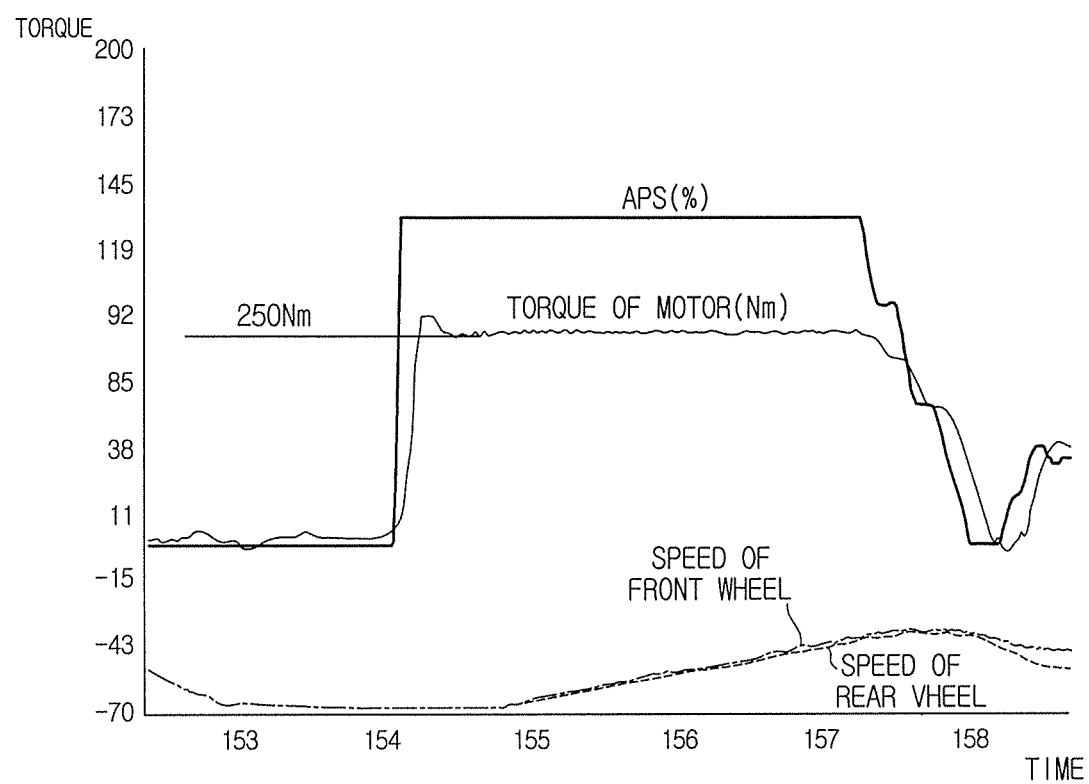
FIG. 8B is a slip graph of the vehicle according to an embodiment of the present disclosure.

FIG. 8A is a slip graph of a conventional vehicle. FIG. 8B is a slip graph of the vehicle according to the embodiment of the present disclosure.

As illustrated in FIG. 8A, the conventional vehicle may increase a torque of the motor based on pressure applied on the accelerator pedal when the accelerator pedal is pressed.

At this time, the conventional vehicle may increase the torque of the motor unevenly since a driving force becomes greater than a friction force with the road surface. In the conventional vehicle, when the torque increases, the speed of the front wheels among the plurality of wheels may increase, and the speed of the rear wheels may also increase due to the increase in speed of the front wheels. As a result, a driving force may become greater than a friction force with the road surface, causing slip of the wheels.

However, as shown in FIG. 8B, the vehicle according to the current embodiment may adjust the torque of the motor based on weight of the vehicle and a coefficient of friction corresponding to a condition of the road surface when the accelerator pedal is pressed, thereby preventing the driving force of the vehicle from becoming greater than a friction force between the wheels and the road surface in advance.

The vehicle according to the current embodiment can increase the speed of the front and rear wheels constantly without causing slip of the wheels, when the accelerator pedal is pressed.

As is apparent from the above description, the vehicle may primarily determine a torque of the motor using information detected through the speed detector and the pressure detector of the accelerator pedal, secondarily determine a torque of the motor based on at least one of a friction force of the road surface and weight, and then control the motor based on the secondarily determined torque, thereby reducing slip of the wheels.

Further, the vehicle can optimize power performance and acceleration performance, improve driving safety, and reduce accidents by reducing slip of the wheels.

Accordingly, by preventing slip of the wheels, it is possible to improve the quality and marketability of the vehicle, thereby increasing user satisfaction and ensuring product competitiveness.

Although a few embodiments of the present disclosure have been shown and described herein, it will be appreciated by those skilled in the art that changes may be made to the disclosed embodiments without departing from the principles and spirit of the disclosure, the scope of which is defined in the claims and their equivalents.

What is claimed is:

1. A vehicle comprising:
a plurality of wheels;
a motor configured to apply a driving force to the plurality of wheels;
a rain detector, arranged outside the vehicle, configured to detect a precipitation;
a temperature detector configured to detect an outside temperature;
a weight detector configured to detect at least one of a weight of a passenger or a weight of a load in the vehicle;
a speed detector configured to detect a driving speed of the vehicle;
a pressure detector configured to detect pressure applied on an accelerator pedal;
a storage device configured to store a first correction value corresponding to the weight of the vehicle, a second correction value corresponding to the precipitation and a third correction value corresponding to a frozen state of the road surface; and
a controller configured to:
obtain a torque of the motor based on the driving speed detected by the speed detector and the pressure detected by the pressure detector,
adjust the obtained torque based on the first correction value corresponding to the detected weight when the detected weight is greater than a reference weight,
adjust the obtained torque based on the second correction value corresponding to the detected precipitation when the detected precipitation is more than or equal to a reference precipitation, the detected outside temperature is higher than or equal to a reference outside temperature, and the detected weight is smaller than or equal to the reference weight, and adjust the obtained torque based on the third correction value corresponding to the frozen state of the road surface when the detected precipitation is more than or equal to the reference precipitation, the detected outside temperature is lower than the reference outside temperature, and the detected weight is smaller than or equal to the reference weight, wherein the frozen state of the road surface is determined by the outside temperature and the precipitation, and wherein the outside temperature includes information to determine strength of ice formed on the road surface.

2. The vehicle according to claim 1,
wherein the controller maintains the obtained torque of the motor when the detected weight is smaller than or equal to the reference weight.

3. The vehicle according to claim 1, further comprising an input device configured to receive a number of passengers,
Wherein, when adjusting the torque of the motor, the controller adjusts the obtained torque of the motor based on the number of passengers input through the input device.

4. The vehicle according to claim 1, further comprising an input device configured to receive weather information of snow and frost,
wherein the controller adjusts the obtained torque of the motor based on the weather information input through the input device.

5. The vehicle according to claim 1,
wherein the controller adjusts the obtained torque of the motor based on the first correction value and the second correction value when the detected precipitation is more than or equal to the reference precipitation, the detected outside temperature is higher than or equal to the reference outside temperature, and the detected weight is greater than the reference weight, and
the controller adjusts the obtained torque of the motor based on the first correction value and the third correction value when the detected precipitation is more than or equal to the reference precipitation, the detected outside temperature is lower than the reference outside temperature, and the detected weight is greater than the reference weight.

6. The vehicle according to claim 1, further comprising a reducer disposed between the plurality of wheels and the motor,
wherein the controller obtains a gear ratio of the reducer, and adjusts the obtained torque of the motor based on the obtained gear ratio.

7. A method of controlling a vehicle having a motor for applying a driving force to a plurality of wheels, the method comprising:
obtaining driving speed of the vehicle based on detection information detected by a speed detector;
obtaining pressure applied on an accelerator pedal based on detection information detected by a pressure detector;
obtaining a torque of the motor corresponding to the driving speed and the pressure;
obtaining weight information of the vehicle;
obtaining a precipitation based on detection information detected by a rain detector;
obtaining an outside temperature based on detection information detected by a temperature detector;
obtaining state information of a road surface based on the precipitation detected by the rain detector and the outside temperature detected by the temperature detector;
adjusting the obtained torque based on a first correction value corresponding to the obtained weight when the obtained weight is greater than a reference weight;
adjusting the obtained torque based on a second correction value corresponding to the obtained precipitation when the obtained precipitation is more than or equal to a reference precipitation, the obtained outside temperature is higher than or equal to a reference outside temperature, and the obtained weight is smaller than or equal to the reference weight; and
adjusting the obtained torque based on a third correction value corresponding to the state information of the road surface when the obtained precipitation is more than or equal to the reference precipitation, the obtained outside temperature is lower than the reference outside temperature, and the obtained weight is smaller than or equal to the reference weight,
wherein the weight information of the vehicle includes at least one of weight information of a passenger or weight information of a load in the vehicle, and
wherein the outside temperature includes information to determine strength of ice formed on the road surface.

8. The method according to claim 7, wherein the obtaining state information of a road surface comprises
obtaining weather information input through an input device,
wherein the weather information includes information about whether it rains, information about whether it snows, information about whether it frosts, information about a precipitation, and information about an amount of snow.

9. The method according to claim 7,
wherein the obtaining weight information of the vehicle comprises obtaining a weight of the vehicle based on detection information detected by weight detectors disposed in a seat and a trunk.

10. The method according to claim 9, wherein the obtaining weight information of the vehicle further comprises estimating a weight of the vehicle based on a number of passengers and an amount of load input through an input device.

11. The method according to claim 7, further comprising maintaining the obtained torque of the motor when the detected weight is smaller than or equal to the reference weight.

12. The method according to claim 7, further comprising adjusting the obtained torque of the motor based on the first correction value and the second correction value when the detected precipitation is more than or equal to the reference precipitation, the detected outside temperature is higher than or equal to the reference outside temperature, and the detected weight is greater than the reference weight.

13. The method according to claim 7, further comprising adjusting the obtained torque of the motor based on the first correction value and the third correction value when the detected precipitation is more than or equal to the reference precipitation, the detected outside temperature is lower than the reference outside temperature, and the detected weight is greater than the reference weight.

* * * * *